(12) United States Patent
Meggiolan

(10) Patent No.: US 7,967,392 B2
(45) Date of Patent: Jun. 28, 2011

(54) HUB BODY FOR A BICYCLE WHEEL AND HUB COMPRISING SUCH A HUB BODY

(75) Inventor: Mario Meggiolan, Creazzo (IT)

(73) Assignee: Campagnolo S.R.L., Vicenza (IT)

( * ) Notice: Subject to any disclaimer, the term of this patent is extended or adjusted under 35 U.S.C. 154(b) by 0 days.

(21) Appl. No.: 12/625,102

(22) Filed: Nov. 24, 2009

(65) Prior Publication Data

US 2010/0066159 A1 Mar. 18, 2010

Related U.S. Application Data

(62) Division of application No. 11/126,819, filed on May 11, 2005, now Pat. No. 7,631,944.

(30) Foreign Application Priority Data

Jul. 9, 2004 (EP) .................................. 04425509

(51) Int. Cl.
*B60B 1/04* (2006.01)
(52) U.S. Cl. .......................................... 301/59; 301/104
(58) Field of Classification Search ..................... 301/55, 301/56, 59, 61, 104, 110.5
See application file for complete search history.

(56) References Cited

U.S. PATENT DOCUMENTS

| 496,844 | A | | 5/1893 | Baker |
| 582,486 | A | | 5/1897 | Rowe |
| 5,429,421 | A | * | 7/1995 | Watson ........................... 301/61 |
| 5,489,147 | A | * | 2/1996 | Borsai .............................. 301/59 |
| 5,626,401 | A | | 5/1997 | Terry, Sr. et al. |
| 5,795,036 | A | | 8/1998 | Campagnolo |
| 6,010,197 | A | * | 1/2000 | Crosnier et al. ................. 301/59 |
| 6,036,279 | A | | 3/2000 | Campagnolo |
| 6,409,282 | B1 | | 6/2002 | Nakajima |
| 6,431,658 | B1 | | 8/2002 | Nakajima |
| 6,899,401 | B2 | * | 5/2005 | Schlanger ........................ 301/59 |
| 2003/0173821 | A1 | * | 9/2003 | Chen ............................... 301/59 |

FOREIGN PATENT DOCUMENTS

| EP | 1016553 A2 | 7/2000 |
| GB | 250059 | 4/1926 |
| JP | 07025201 | 1/1995 |
| JP | 09-002006 | 1/1997 |
| JP | 09-109602 | 4/1997 |
| JP | 06-219101 | 8/1997 |
| JP | 11-321201 | 11/1999 |
| JP | 2000-198301 | 7/2000 |
| JP | 2004-075044 A | 3/2004 |

OTHER PUBLICATIONS

English translation of Nov. 24, 2010 Office Action issued in corresponding Japanese Appln. No. 2005-200133.

* cited by examiner

*Primary Examiner* — Kip Kotter
(74) *Attorney, Agent, or Firm* — Volpe And Koenig, P.C.

(57) ABSTRACT

A hub body for a bicycle wheel has a substantially tubular body extending along a longitudinal axis with a pair of opposite end portions, at least one of which has an annular front surface on which a plurality of housing seats for an end portion of respective spokes are formed. Advantageously, at least some of these seats comprise retention elements adapted to prevent said spokes from moving along a direction substantially parallel to said longitudinal axis in all operating conditions. The spoke is thus prevented from moving away from the hub in the case of untightening or breaking of a spoke during a race, which would compromise the correct operation of the wheel and/or constitute a danger to the cyclists.

19 Claims, 15 Drawing Sheets

HUB BODY FOR A BICYCLE WHEEL AND HUB COMPRISING SUCH A HUB BODY

CROSS REFERENCE TO RELATED APPLICATIONS

This application is a division of U.S. patent application Ser. No. 11/126,819, filed May 11, 2005, which is incorporated by reference as if fully set forth.

FIELD OF INVENTION

The present invention relates to a hub body for a bicycle wheel, in particular, for a racing bicycle wheel. The invention also relates to a hub for a bicycle wheel comprising such a hub body and to a bicycle wheel comprising such a hub.

BACKGROUND

Known bicycle wheels comprise a plurality of spokes extending between the hub, which constitutes the central element of the wheel intended to be associated with the bicycle frame, and the rim on which the tire is mounted.

The hub, in turn, comprises a body on which the spokes and a shaft are intended to be mounted and a shaft, integrally and rotatably associated through bearings with said body and extending longitudinally inside of it, intended to be connected through its free ends to the bicycle frame.

An example of a hub known in the art and particularly advantageous in terms of practicality and simplicity of assembly of the spokes has a hub for flat spokes, in which the hub body comprises a tubular end portion terminating with an annular front surface having a plurality of radial front recesses constituting spoke housing seats. Each spoke has a widened head of attachment to the hub having a T-shaped configuration. Each spoke also has a flattened spoke body portion immediately adjacent to the widened head. The widened head of attachment to the hub is housed inside the tubular end portion of the hub body, whereas the flat portion of the body of the spoke is housed in the recess formed on the front annular surface of the hub body. The T-shape of the widened head of attachment to the hub prevents the spoke from moving in the radial direction of the wheel towards the rim once the spoke has been tightened. The movements of the spoke in the axial direction of the hub, towards the outside thereof, on the other hand, are prevented by an annular edge formed at the free end of the hub and bent radially inwards; such an edge extends circumferentially between each pair of contiguous recesses and defines an abutment surface for an upper portion of the front surface of the widened head of attachment to the hub of each spoke. Such an edge also defines on the recess an opening of a size equal to the width of the flat spoke body portion.

The Applicant has found that a hub of the type described above has the drawback that, following untightening or breaking of a spoke that causes a movement of the spoke in the radial direction of the wheel towards the centre of the hub (that is a movement of the spoke along its longitudinal axis towards the centre of the hub), the spoke can come out from the front recess in which it is housed and thus move away from the hub, thus compromising the correct operation of the wheel and/or constituting a danger to the cyclists, especially during a race where cyclists ride in groups.

SUMMARY

The Applicant has thus conceived and manufactured a hub for a bicycle wheel that does not have the drawback discussed above.

The present invention therefore relates, in a first aspect thereof, to a hub body for a bicycle wheel, comprising:

a substantially tubular body extending along a longitudinal axis X-X and provided with a pair of opposite end portions, wherein at least one end portion of said pair of opposite end portions comprises an annular front surface;

a plurality of seats formed on said annular front surface of said body and configured to house an end portion of respective spokes;

wherein at least some seats of said plurality of seats comprise retention means configured to prevent said spokes from moving along a direction substantially parallel to said longitudinal axis X-X in all operating conditions.

BRIEF DESCRIPTION OF THE DRAWING(S)

Further characteristics and advantages of the present invention shall become clearer from the following detailed description of some preferred embodiments thereof, made with reference to the attached drawings. In such drawings, FIG. 1 is a schematic side view of a first embodiment of a hub body in accordance with the present invention;

DETAILED DESCRIPTION OF THE PREFERRED EMBODIMENT(S)

Introduction

Figure 1:
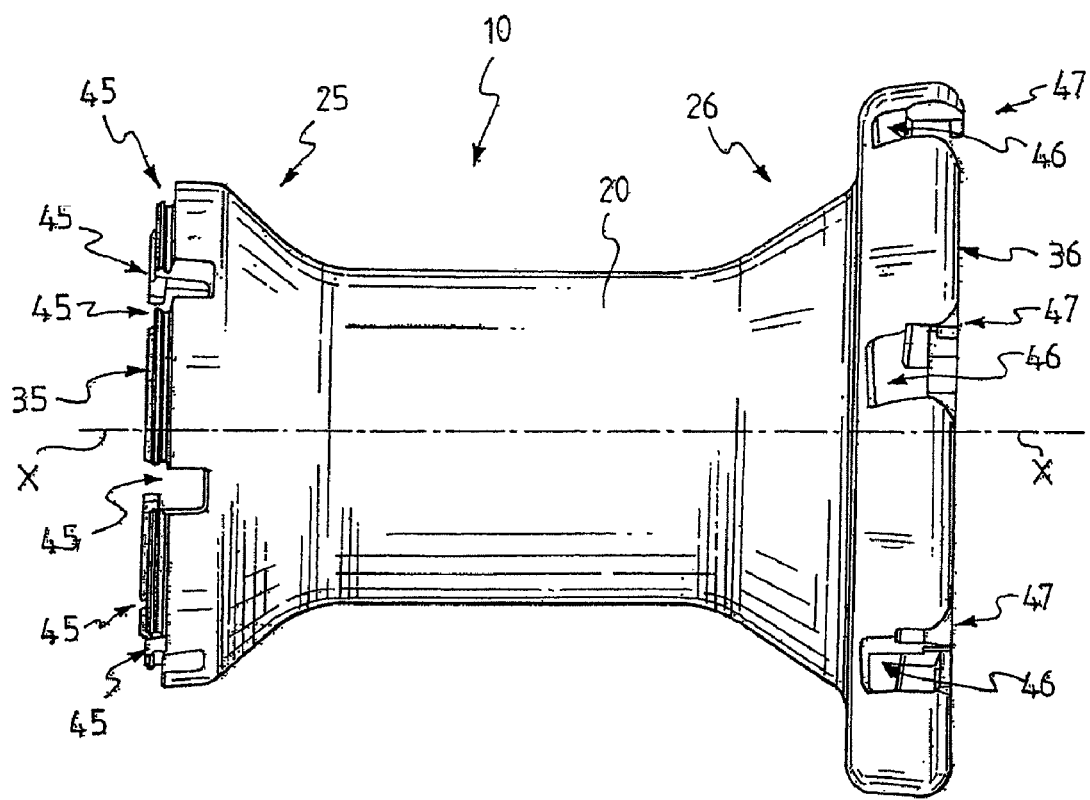

The preferred embodiments of the present invention will be described with reference to the drawing figures where like numerals represent like elements throughout. For the sake of simplicity, elements introduced in one figure will not be reintroduced in subsequent figures; it being understood that the elements sharing the same reference number are identical.

Further, throughout the present description and in the subsequent claims, the expression: "hub body", is used to indicate the body on which the spokes of the bicycle wheel are intended to be mounted. The term: "hub", on the other hand, is used to indicate, in the case of a front hub, the group intended to be associated with the bicycle frame and, in the case of a rear hub, the group comprising the hub body, the longitudinal shaft provided inside the hub body and the body carrying the sprockets.

Advantageously, the inventive hub body overcomes the prior art's drawbacks discussed above by providing the seats formed on the annular front surface of the hub body with suitable retention means configured to prevent the spokes from moving in the longitudinal direction of the hub body. The spokes, therefore, are held in the respective seats in whatever operating condition of the wheel, even in the case of untightening or breaking that causes a radial movement of the spoke itself towards the center of the wheel.

Advantageously, the hub body of the present invention is configured to be used in manufacturing bicycle wheels having conventional radial configurations (that is with the spokes of the wheel all oriented radially) and crossed configuration (that is with each spoke at a side of the hub that crosses at least one other spoke at the same side of the hub). Preferably, in the case of a radial configuration, all of the seats of said plurality of seats comprise the aforementioned retention means. On the other hand, in the case of a crossed wheel configuration, only some seats of said plurality of seats comprise the aforementioned retention means, as shall be explained more clearly in the rest of the present description.

Even more advantageously, the hub body of the present invention can be used to manufacture a hub for both rear wheels and front wheels. Preferably, in the case of a hub for a rear wheel or for a front wheel with disc brake, the opposite end portions of the hub body of the present invention are different and configured to form a radial configuration and a crossed configuration, respectively, whereas in the case of a hub for a front wheel without disc brake, the opposite end portions of the hub body of the present invention are preferably identical and, more preferably, configured to form a radial configuration.

However, the hub body of the present invention can be used in other preferred configurations with respect to those described above, such as rear wheel configurations in which the opposite end portions of the hub body of the present invention are identical (for example both crossed), front wheel configurations in which the opposite end portions of the hub body of the present invention are identical and both configured to have a crossed configuration, or generic wheel configurations in which the spokes are not arranged radially.

Preferably, the retention means are integrally formed with the annular front surface of the hub body of the present invention and extend at least partially on the aforementioned seats. Advantageously, the retention of the spokes in the respective seats is thus achieved without using additional elements to (and/or distinct from) the hub body itself. This simplifies manufacture and minimizes production cost, weight and encumbrance of the hub, thus satisfying the ongoing requirements of manufacturers of bicycles and/or components for racing bicycles.

In accordance with a first preferred embodiment of the present invention, the aforementioned retention means define an opening of predetermined length that is smaller than the maximum size of the cross section of a spoke body portion intended to be associated with said substantially tubular body. Advantageously, the opening allows easy assembly of spokes having a longitudinally flat body portion (for example spokes with a rectangular or elliptical section) onto the inventive hub body and in particular having, in cross section, a minimal size (for example the thickness of the spoke) smaller than the circumferential length of such an opening and a maximum size (for example the width of the spoke) greater than the circumferential length of the opening, as shall be explained more clearly in the rest of the present description.

Preferably, said opening of predetermined length is defined by at least one element that extends cantilevered on a respective seat of said plurality of seats.

In a first embodiment of the hub body of the present invention, the aforementioned opening of predetermined length is defined by a single element that extends cantilevered on the respective seat from a side of the seat itself. In a preferred embodiment, the aforementioned opening is defined between a pair of elements that extend from opposite sides on the respective seat of said plurality of seats. More preferably, in the case of a wheel with radial configuration, the aforementioned single element or the elements of the aforementioned pair of elements extend on the respective seat along a circumferential direction.

Preferably, in the case of flat spokes, the predetermined length of the aforementioned opening is greater than a minimum size of a cross section of a flat spoke body portion intended to be associated with the aforementioned substantially tubular body and smaller than a maximum size of the aforementioned cross section of said flat spoke body portion. On the other hand, in the case of cylindrical spokes, the predetermined length of the aforementioned opening is smaller than the diameter of a cross section of a portion of the cylindrical spoke body.

In accordance with an alternative embodiment of the hub body of the present invention, the retention means comprise a single bridge-type element that extends (in the specific case of a wheel with radial configuration, along a circumferential direction) on a respective seat of said plurality of seats continuously with the front annular surface of said substantially tubular body. In such a case, the assembly of the spokes on the hub body is carried out, irrespective of the type of spokes used, according to methods different to those of the aforementioned first preferred embodiment, as shall be explained more clearly in the rest of the present description.

Preferably, the aforementioned seats comprise a first housing portion for a head of attachment to the hub of a respective spoke and a second housing portion for a body portion of said spoke immediately adjacent to the head of attachment to the hub, and the retention means are defined at the aforementioned first housing portion. In respective alternative embodiments, the retention means can, however, be defined at the aforementioned second housing portion or at a zone interposed between the aforementioned first housing portion and the aforementioned second housing portion.

In further alternative embodiments of the hub body of the present invention, the retention means extend radially and towards the inside of the aforementioned substantially tubular body or radially and towards the outside of the aforementioned body.

In the preferred embodiment of the hub body of the present invention, the housing portion for the head of attachment to the hub of the spoke has a shape (preferably frusto-conical) matching that of said head of attachment to the hub of the spoke.

The aforementioned seats can be oriented on the front annular surface of the hub body of the present invention to yield a configuration of spokes arranged radially, a configuration of spokes arranged not radially or a configuration with crossed spokes. In this last case, preferably, the hub body of the present invention comprises:
- a plurality of first seats defined on a first annular portion of a first end portion of said substantially tubular body and configured to house an end portion of respective first spokes;
- a plurality of second seats defined on a second annular portion of said first end portion of said substantially tubular body and configured to house an end portion of respective second spokes;
wherein said second annular portion of said first end portion of said substantially tubular body is contiguous and arranged externally along said longitudinal axis X-X with respect to said first annular portion of said first end portion of said substantially tubular body and wherein said plurality of first and second seats are oriented so that each spoke of said respective second spokes crosses at least one spoke of said respective first spokes;
wherein said retention means are defined at said plurality of second seats.

In such a case, the retention of the aforementioned second spokes in the seats of the aforementioned plurality of second seats is achieved through abutment of such spokes against the retention means properly provided in the seats of the aforementioned plurality of second seats, whereas the retention of the aforementioned first spokes in the seats of the aforementioned plurality of first seats is achieved through abutment of such spokes against the aforementioned second spokes, as shall be explained more clearly in the rest of the present description.

Preferably, both of the end portions of said pair of opposite end portions comprise an annular front surface.

In a second aspect thereof, the present invention relates to a hub for a bicycle wheel, comprising:
- a hub body comprising a plurality of seats configured to house an end portion of respective spokes;
- a shaft extending along a longitudinal axis X-X inside said hub body and configured to be associated with a bicycle frame;
characterized in that the aforementioned hub body is of the type described above.

Such a hub thus has all of the advantageous characteristics discussed above with reference to the hub body of the present invention.

In a third aspect thereof, the present invention relates to a bicycle wheel, comprising:
- a hub;
- a rim;
- a plurality of spokes extending between said hub and said rim;

characterized in that said hub comprises a hub body of the type described above.

Such a wheel thus has all of the advantageous characteristics discussed above with reference to the hub body of the present invention.

DESCRIPTION OF THE EMBODIMENTS

Figure 5:
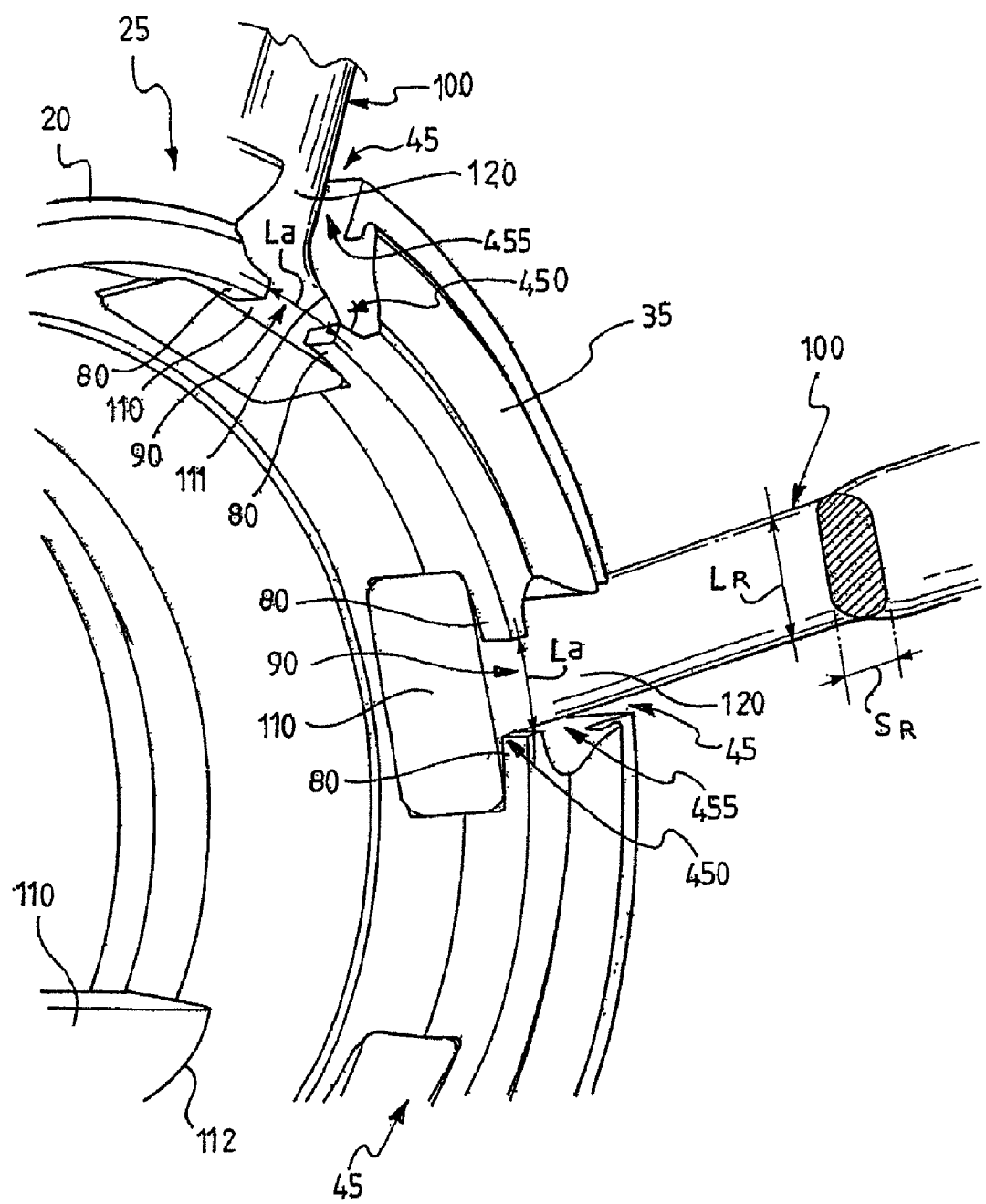
FIG. 5 is a schematic perspective and enlarged view of the detail of FIG. 4 in a configuration with spokes mounted thereon.
Figure 12:
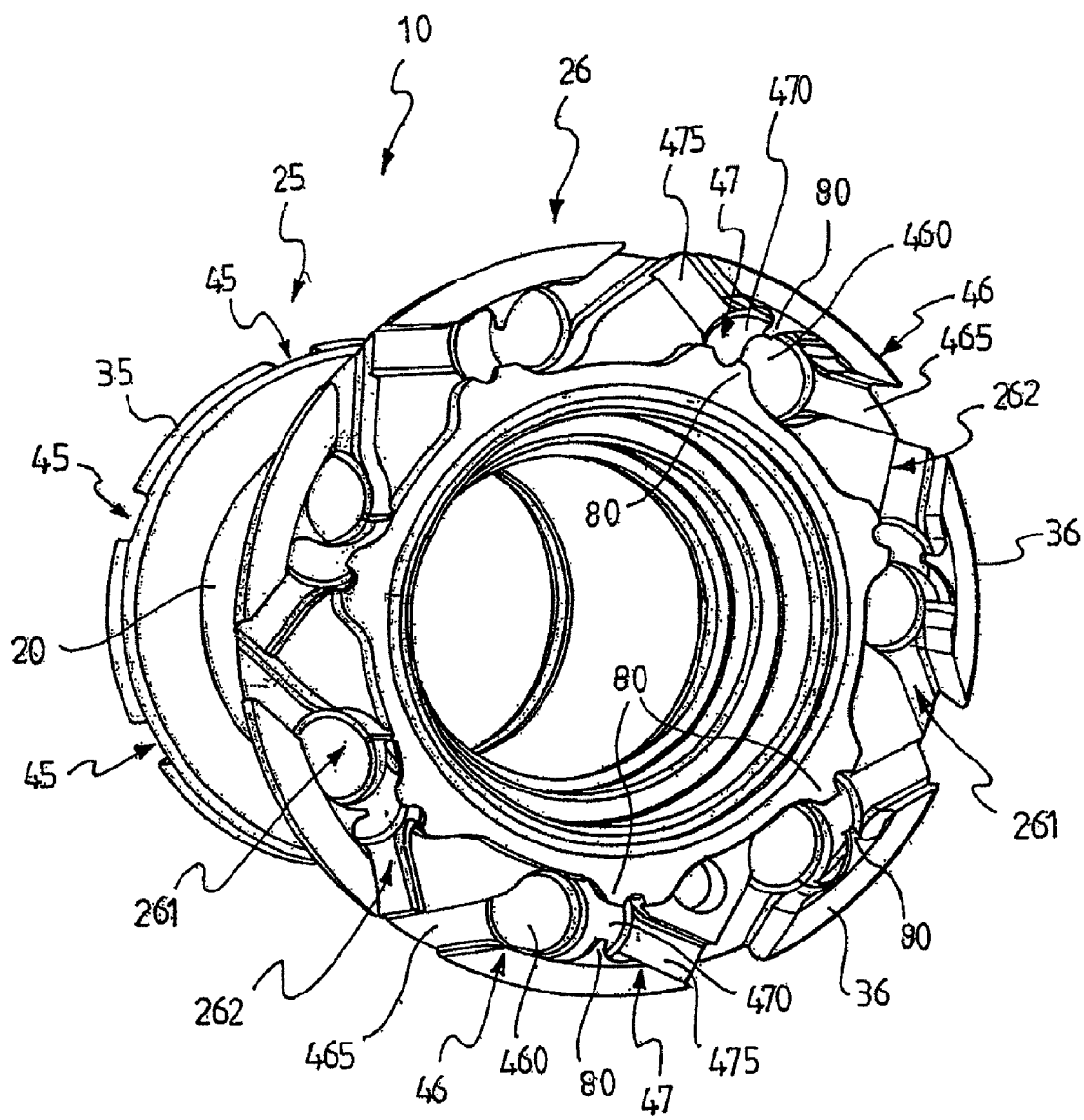
FIG. 12 is a schematic perspective view of the right-hand end portion of the hub body of FIG. 1.

In the attached figures from 1 to 5 and 12, and in particular in FIGS. 1, 5 and 12, a hub body in accordance with a first exemplificative embodiment of the present invention is indicated with 10, whereas figures from 6 to 9 and from 13 to 15 show respective alternative embodiments of the hub body of the present invention.

Figure 16:
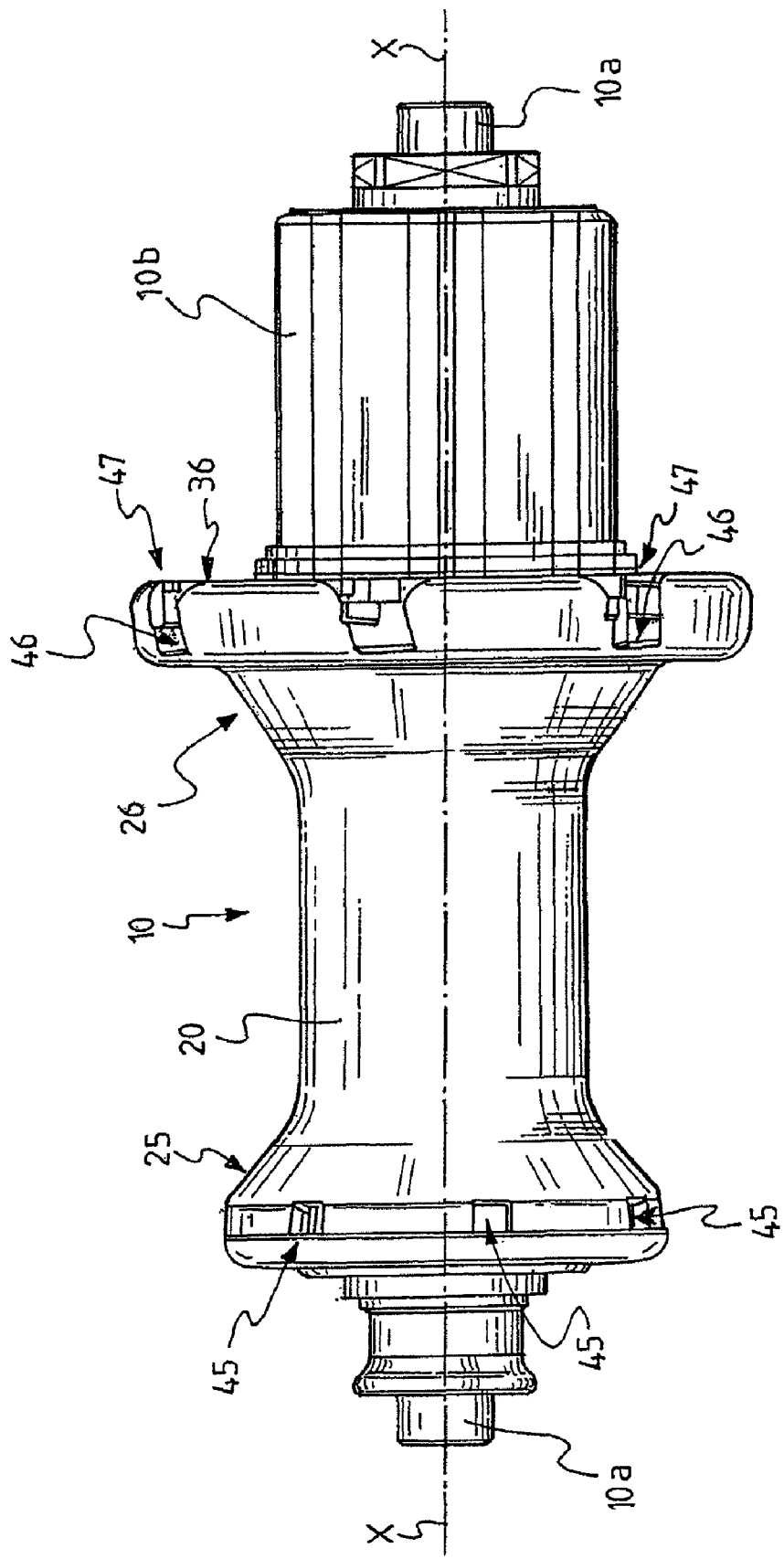
FIG. 16 is a schematic front view of a hub comprising the hub body of FIG. 1.
Figure 17:
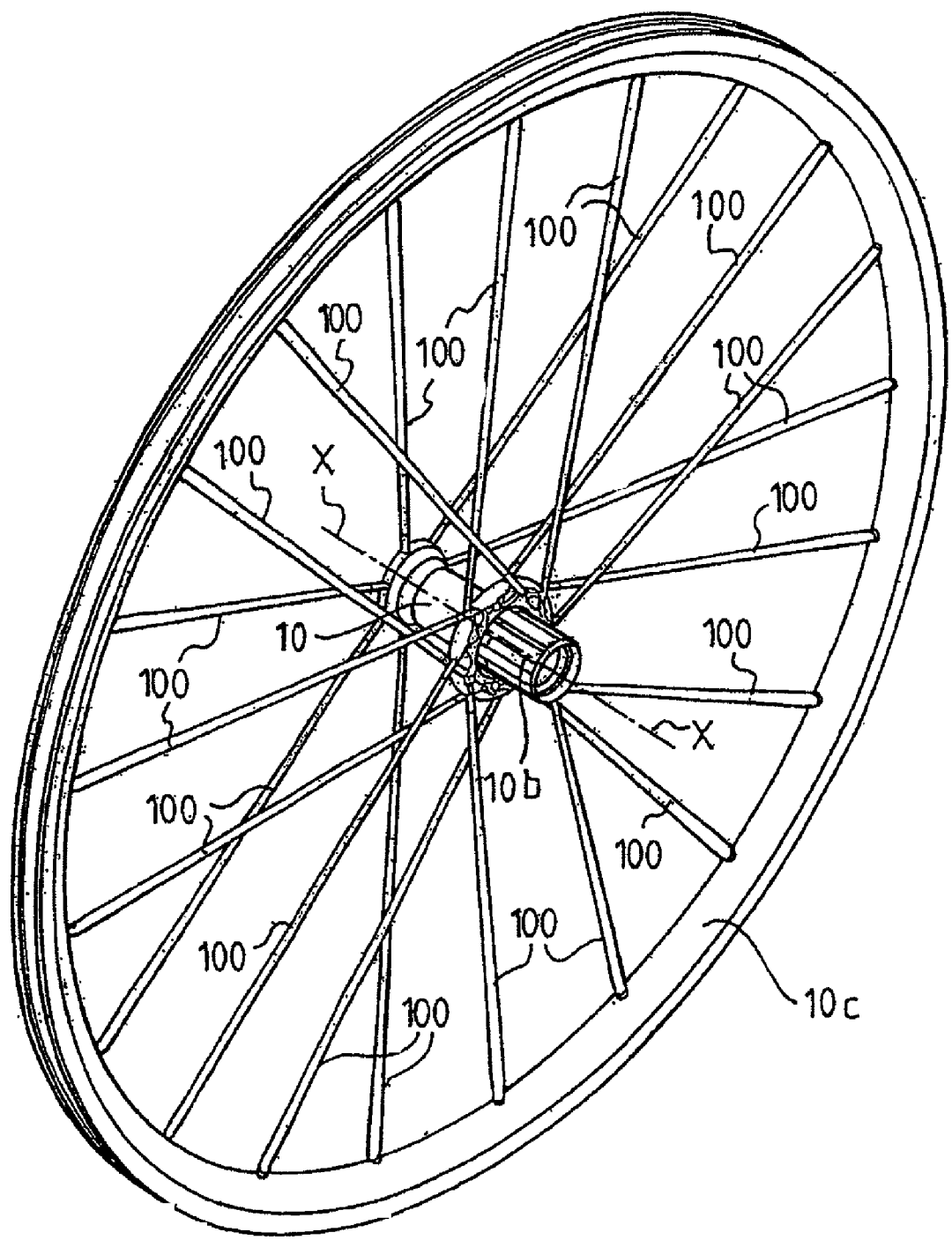
FIG. 17 is a schematic perspective view of a wheel comprising the hub of FIG. 16.

The hub body illustrated in the attached figures is intended to integrally house inside of it a longitudinal shaft 10a (see FIG. 16) which in turn is intended to be associated, at the opposite free ends thereof, with a bicycle frame (not illustrated). Such a hub is intended to be associated with a rim 10c of a bicycle wheel through a plurality of spokes 100 (see FIG. 17).

The hub body 10 illustrated in the aforementioned figures comprises a substantially tubular body 20 extending along a longitudinal axis X-X and provided with a pair of flanged opposite end portions 25, 26 having respective annular front surfaces 35, 36 on which a plurality of seats are formed, all respectively indicated with 45 in the left-hand end portion 25 and with 46, 47 in the right-hand end portion 26 (with reference to the orientation of the hub body 10 of FIG. 1). The aforementioned seats 45, 46, 47 are each configured to house an end portion of a respective spoke 100, illustrated in FIGS. 3, 5, 10, 13-15 and 17.

The hub body 10 illustrated in the attached FIGS. 1 and 5 is configured to be used in a hub for a rear wheel of a bicycle (illustrated in FIGS. 16 and 17) or for a front wheel with disc brakes. In the hub body 10, the seats 45 formed in the annular front surface 35 of the end portion 25 are oriented in such a way to allow a connection of the spokes 100 according to a conventional radial configuration (better illustrated in figures from 2 to 5) and are each divided by a central radial plane H that extends in the direction of the longitudinal axis X-X of the hub body 10. The seats 46, 47 formed in the annular front surface 36 of the end portion 26 are oriented in such a way to allow an arrangement of the spokes according to a conventional crossed configuration (better illustrated in FIG. 12). The end portion 26, in the specific case illustrated in the attached drawings, is intended to receive a conventional body 10b carrying the sprockets (illustrated in FIGS. 16 and 17), used in the assembly onto the hub of the rear wheel of a bicycle of a group of sprockets of a bicycle gearshift, or the brake disc of a front wheel.

Throughout the present description, explicit reference shall be made to a hub body for a bicycle wheel with spokes that are radial on one side and crossed on the other, like the one illustrated in the attached figures. However, a person of ordinary skill in the art will recognize that what has been stated is also applicable to a hub body for different wheels, like a hub body having a pair of end portions 25 and 26 of the same type (preferably both configured in such a way to allow a connection of the spokes according to a radial or crossed configuration).

If desired, the hub body seats of the present invention may be formed in the annular front surface of the end portion of the hub in such a way to allow a connection of the spokes to be oriented according to a non-radial and non-crossed configuration.

As better illustrated in FIGS. 2 to 5, each seat 45 formed on the front annular surface 35 of the end portion 25 of the tubular body 20 comprises a first housing portion 450 for a head 110 of attachment to the hub of a respective spoke 100 and a second housing portion 455 for a body portion 120 of said spoke 100 immediately adjacent to the head 110 of attachment to the hub. More specifically, the first housing portion 450 for the head 110 of attachment to the hub of the spoke 100 has a shape matching that of the head 110 of attachment to the hub of the spoke 100 and comprises a base opening 450a, a flat front surface 451 configured to cooperate in abutment with the head 110 of attachment to the hub of the spoke 100 when said head 110 of attachment to the hub is housed in the first housing portion 450 of the seat 45, and a pair of cylindrical side surface portions 452, 453 having a shape matching the side surface portions 111, 112 of the head 110 of the spoke 100. When the spoke 100 is mounted on the hub and is suitably tightened, these side surface portions go into abutment against the side surfaces 452, 453 of the first housing portion 450 of the seat 45, thus preventing the spoke 100 from any movement along the longitudinal axis of the spoke itself.

In accordance with the present invention and with particular reference to the embodiment of the hub body 10 illustrated in FIGS. 2 to 5, each seat 45 also comprises a pair of spoke retention elements 80 adapted in particular to prevent the spokes 100 from moving along a direction parallel to the aforementioned longitudinal axis X-X of the hub body 10 towards the outside of the hub body 10 itself.

In the specific example illustrated in the attached drawings, the spoke retention elements 80 are an integral part of the annular front surface 35 of the hub body 10 and extend circumferentially towards each other and towards the central planes H of their respective seats 45 only partially on the aforementioned seats 45 so as to be cantilevered. In particular, each pair of elements 80 extends on each first housing portion 450 of the seats 45 on opposite sides so as to define such a first housing portion 450 at the top and so as to delimit an opening 90 of predetermined circumferential length $L_a$ between them. As shown in FIG. 2a, the openings 90 each have a first circumferential length $L_b$ at a first radial distance D1 from the longitudinal axis X-X of the hub, a second circumferential length $L_a$ at a second radial distance D2, greater than the first radial distance D1, which is the predetermined circumferential length between the retention elements 80, and a third circumferential length $L_c$, at a third radial distance D3, greater than the second distance D2. As shown, the second circumferential length La is less than the first $L_b$ and third circumferential lengths $L_c$. The opening 90 allows easy assembly of flat spokes like those shown in FIGS. 3, 5, and 10 onto the hub body of the present invention.

Figure 2:
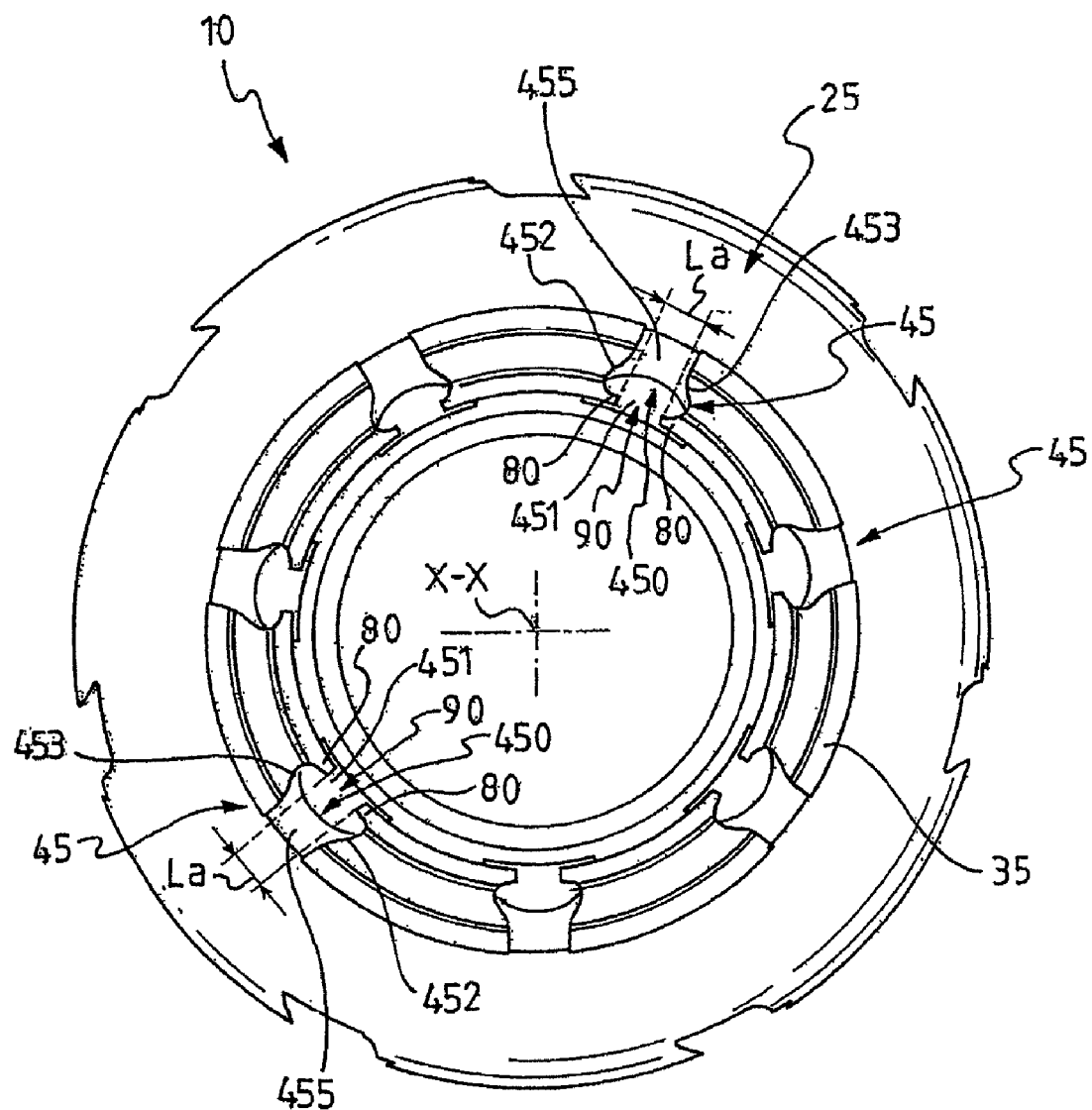
FIG. 2 is a schematic front view of the left-hand end portion of the hub body of FIG. 1.
Figure 2A:
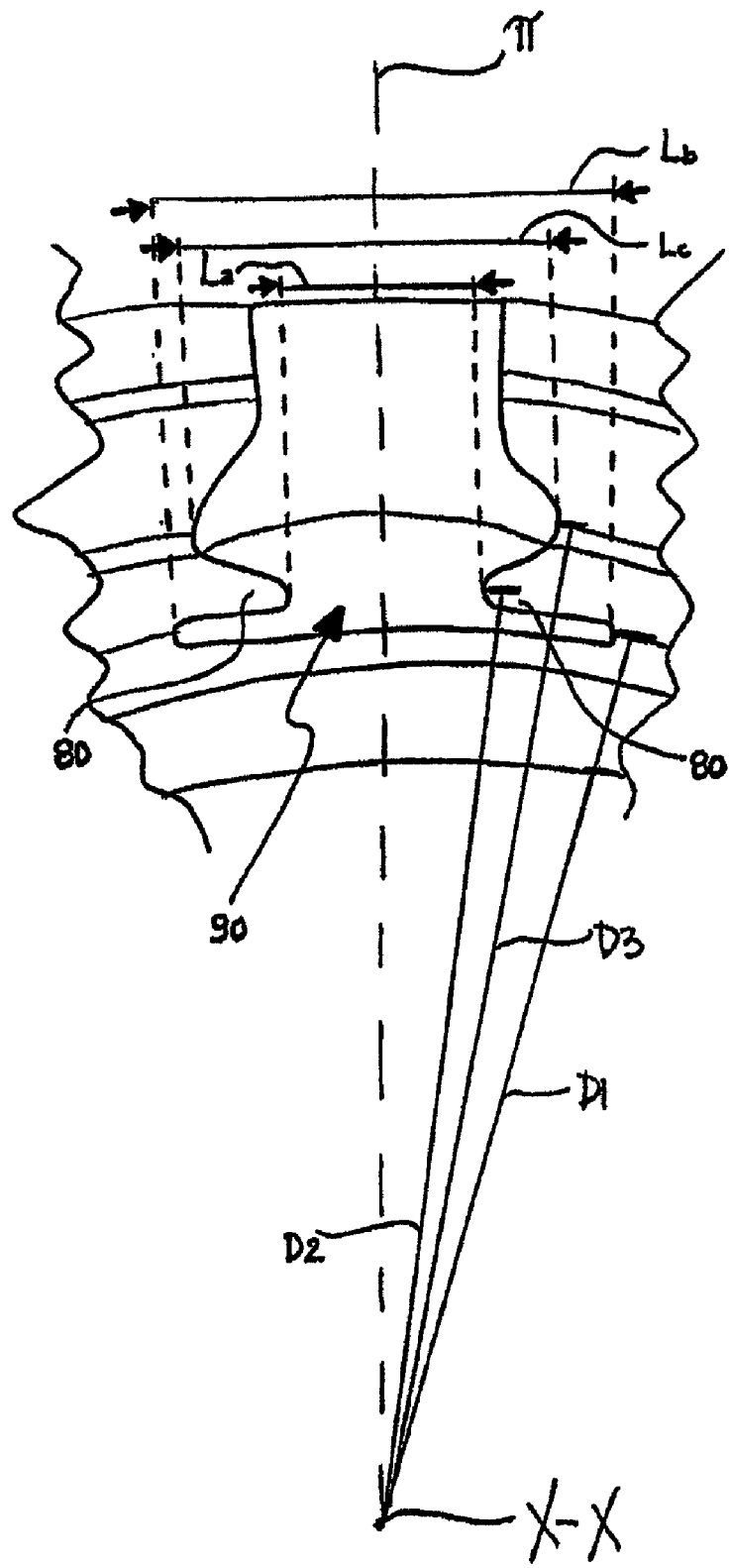
FIG. 2a shows an enlarged detail of the hub as shown in FIG. 2.
Figure 3:
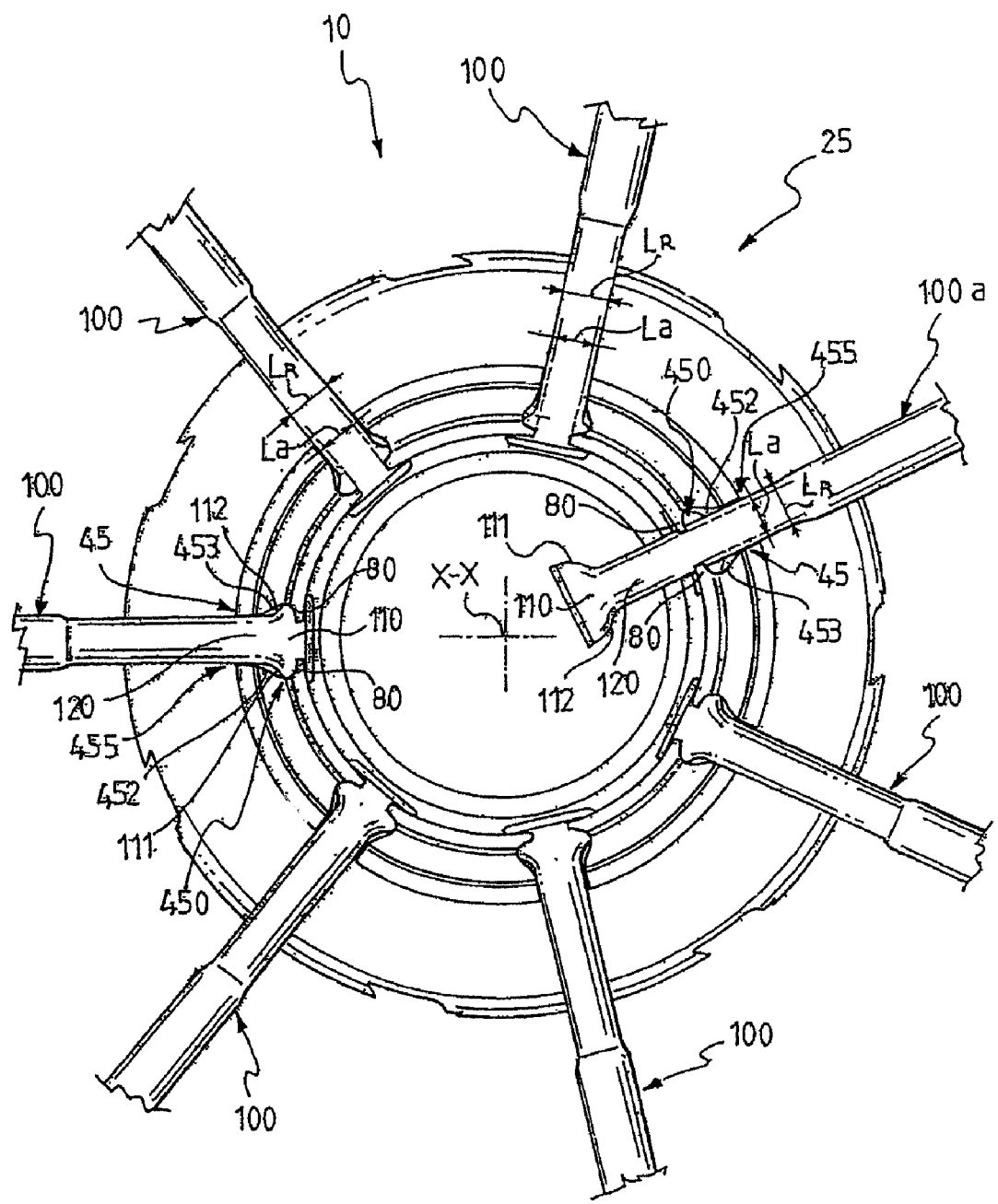
FIG. 3 is a schematic front view of the left-hand end portion of the hub body of FIG. 1 in a configuration with all of the spokes mounted (apart from one, which is illustrated in the assembly and/or tightening step)
Figure 4:
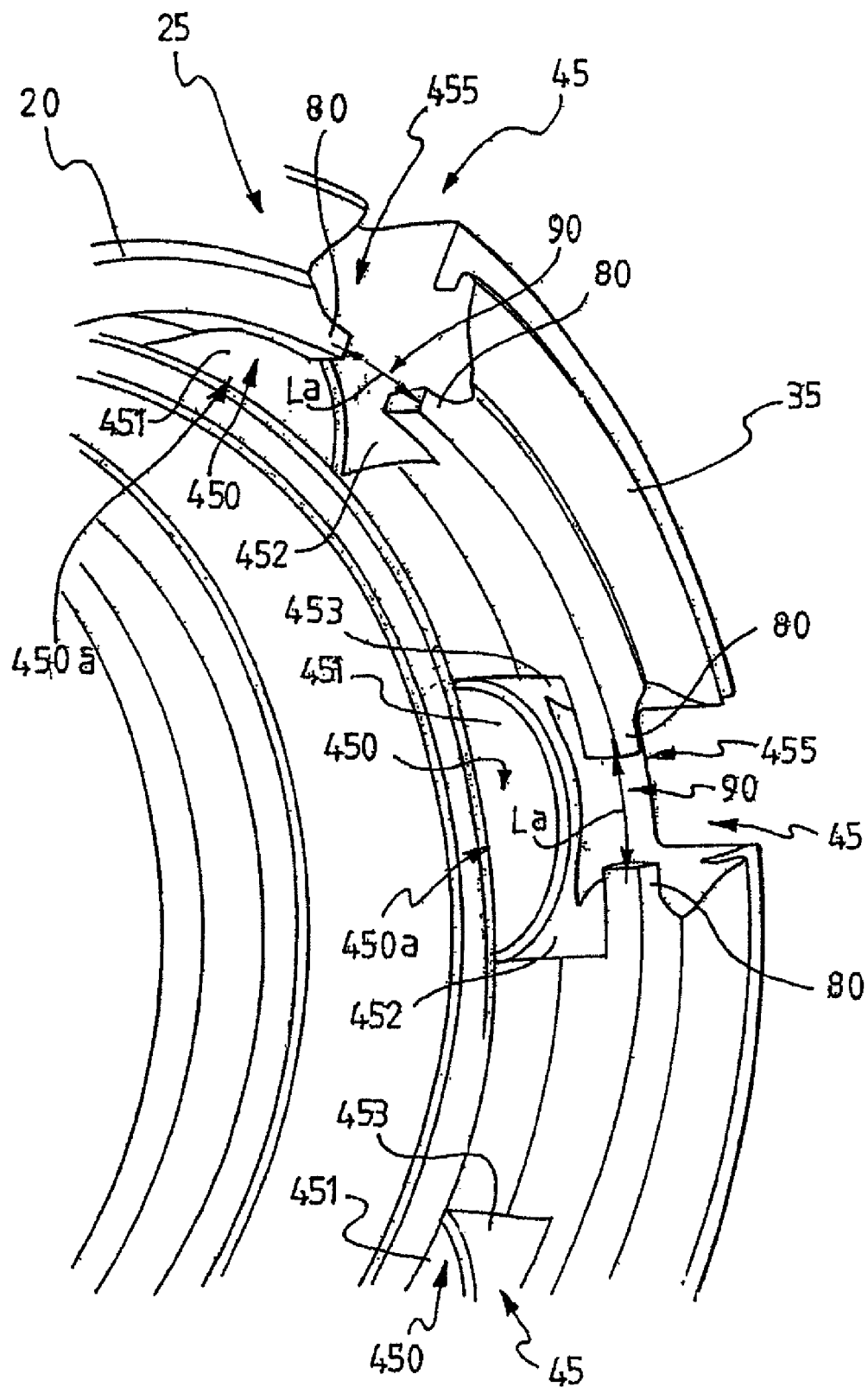
FIG. 4 is a schematic perspective and enlarged view of a detail of the left-hand end portion of the hub body of FIG. 1.

FIG. 2 shows the hub body 10 in a configuration without spokes mounted thereon, whereas FIG. 3 shows the hub body 10 in a configuration in which all of the spokes are shown correctly mounted thereon (i.e. with the respective heads 110 of attachment to the hub housed in the appropriate first housing portions 450 of the seats 45) apart from one, indicated with 100a, which is shown in an incomplete assembly configuration and/or untightened. For the sake of simplicity of illustration and of reading of the figure, the reference numerals, being identical for all of the seats and for all of the spokes illustrated, are shown at just some of the seats and at just some of the spokes.

Figure 6:
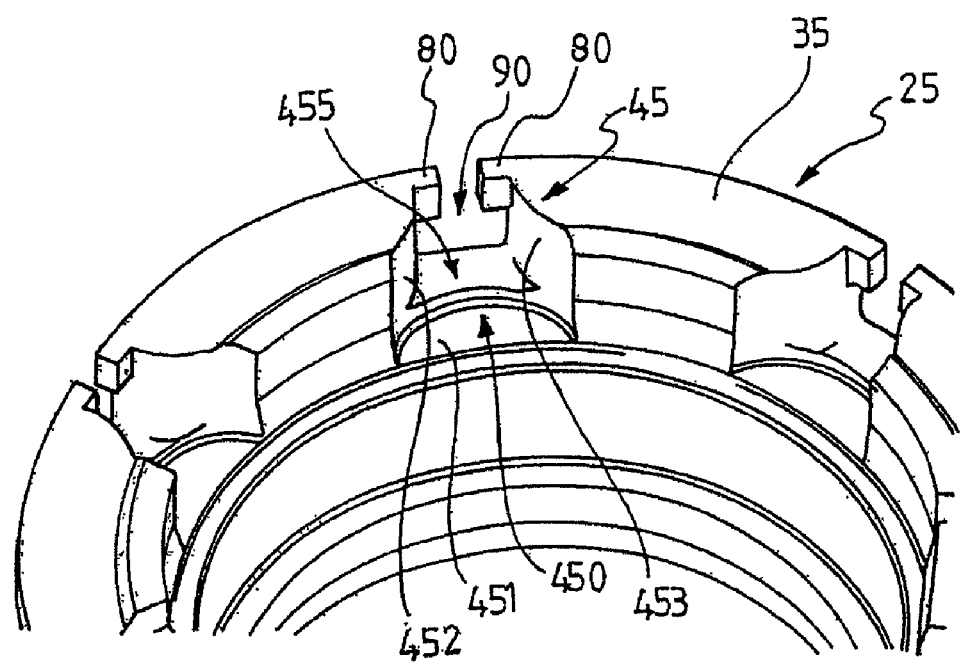
FIG. 6 is a schematic perspective and enlarged view of a detail of an end portion of a second alternative embodiment of the hub body of the present invention.
Figure 7:
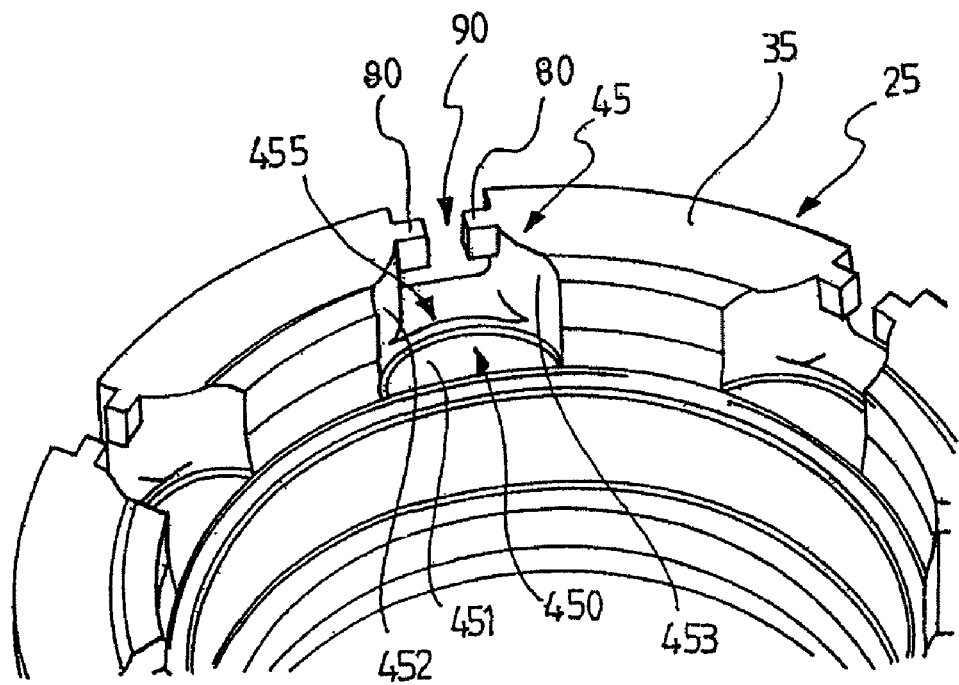
FIG. 7 is a schematic perspective and enlarged view of a detail of an end portion of a third alternative embodiment of the hub body of the present invention.

FIGS. 6 and 7 show alternative embodiments of the hub body of the present invention. The hub body illustrated in these figures differs from the one described above with reference to FIGS. 1 to 5 for the sole fact that each pair of elements 80, instead of extending at the first housing portion 450 of the seats 45, extends, respectively, on a radially outer zone of the front surface 35 of the hub body 10 (FIG. 6) and on an intermediate zone of the front surface 35 of the hub body 10 at the second housing portion 455 of the seats 45 (FIG. 7). In all other respects, the hub body 10 shown in FIGS. 6 and 7 is identical to that shown in FIGS. 1-5, and described above.

Figure 8:
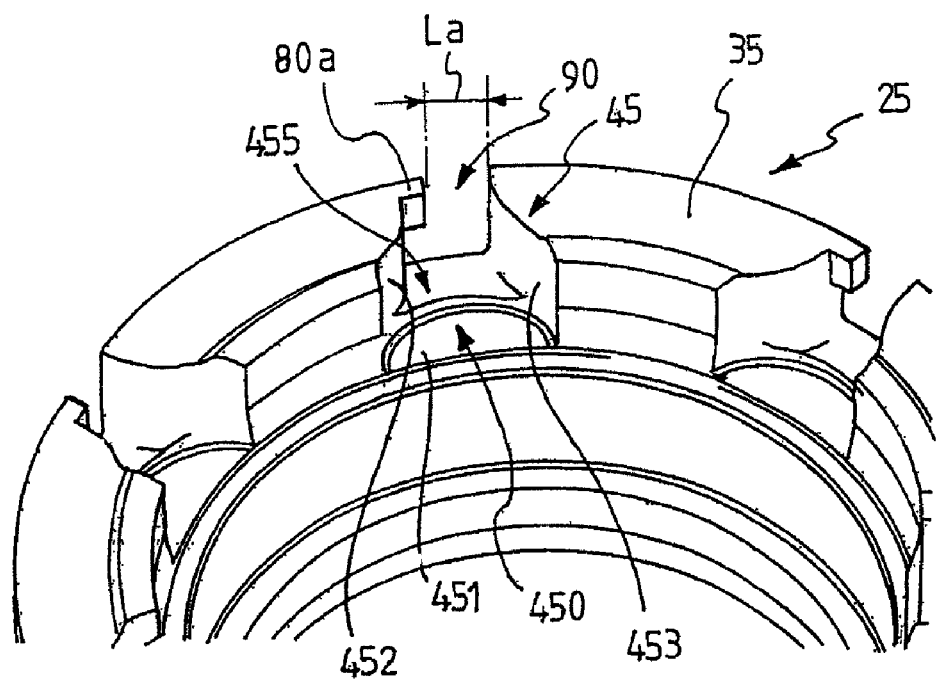
FIG. 8 is a schematic perspective and enlarged view of a detail of an end portion of a fourth alternative embodiment of the hub body of the present invention.

FIG. 8 shows a further alternative embodiment of the hub body of the present invention. The hub body illustrated in this Figure differs from the one described above with reference to FIG. 6 for the sole fact that each seat 45 comprises, instead of a pair of elements 80 separated by an opening 90, a single element 80a that extends cantilevered on the seat 45 from one side thereof for part of the circumferential length of the seat itself so as to define the opening 90 of predetermined length $L_a$ between such an element 80a and the opposite side of the seat 45. In all other respects, the hub body 10 shown in FIG. 8 is identical to that shown in FIGS. 1-5, and described above.

Figure 9:
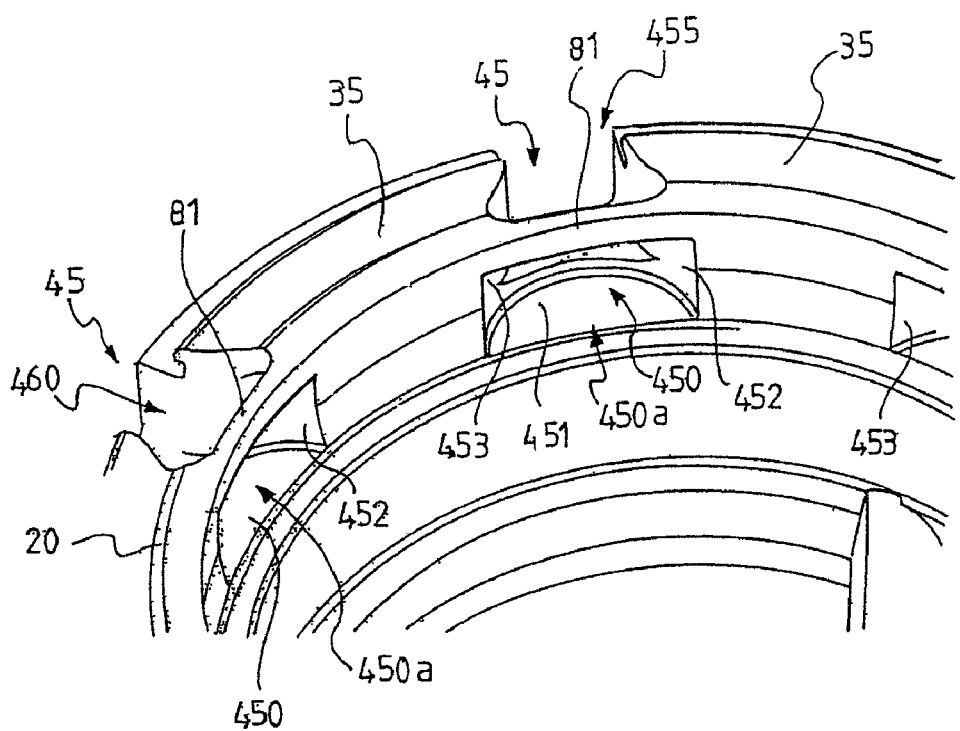
FIG. 9 is a schematic perspective and enlarged view of a detail of an end portion of a fifth embodiment of the hub body of the present invention.
Figure 10:
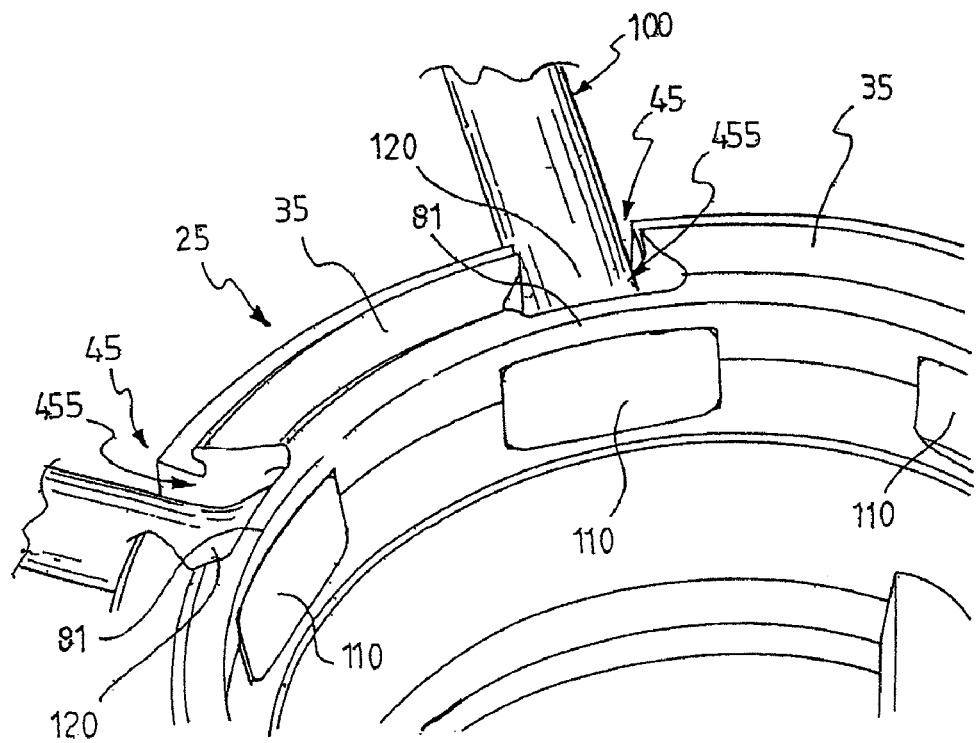
FIG. 10 is a schematic perspective and enlarged view of the detail of FIG. 9 in a configuration with spokes mounted thereon.

FIGS. 9 and 10 show a further alternative embodiment of the hub body of the present invention, respectively in a configuration without spokes and in a configuration with spokes mounted thereon. The hub body illustrated in these figures differs from the one described above with reference to FIGS. 1 to 5 for the sole fact that each seat 45 comprises, instead of a pair of elements 80 separated by an opening 90, a single element 81 that extends like a bridge on the seat 45 for the entire circumferential length of the seat itself without solution of continuity with the annular front surface 35 of the hub body 10. In all other respects, the hub body 10 shown in FIGS. 9 and 10 is identical to that shown in FIGS. 1-5, and described above.

Figure 11:
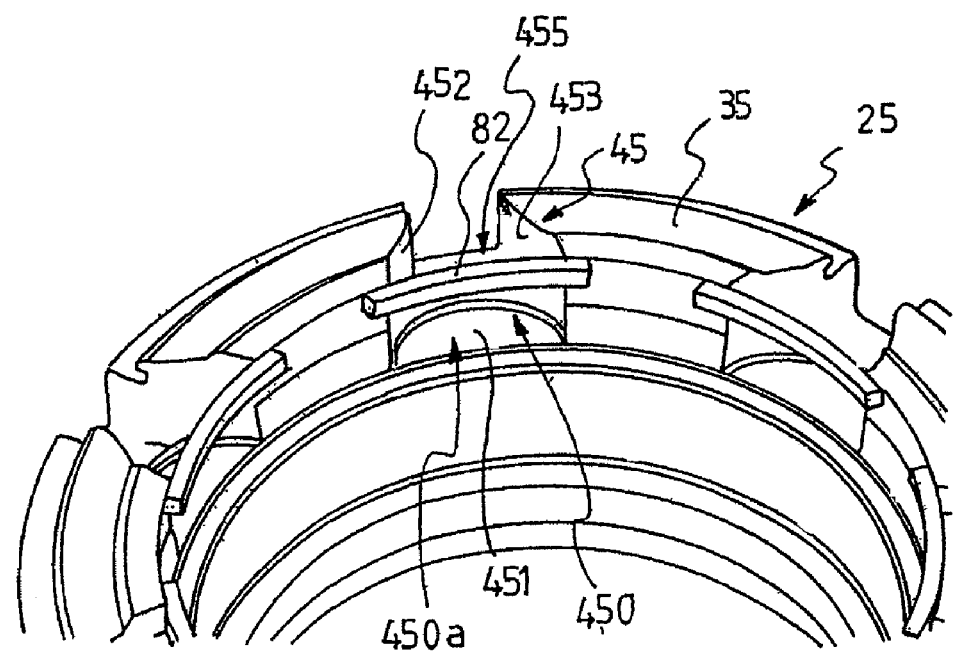
FIG. 11 is a schematic perspective and enlarged view of a detail of an end portion of a sixth embodiment of the hub body of the present invention.

FIG. 11 shows a further alternative embodiment of the hub body of the present invention. The hub body illustrated in these figures differs from the one described above with reference to FIGS. 9 and 10 because the seat 45 comprises a single element 82 that extends like a bridge radially towards the inside of the hub body 10 and circumferentially on the seat 45 for a portion of length at least equal to (preferably greater than) the circumferential length of the seat itself without solution of continuity with the annular front surface 35 of the hub body 10. In all other respects, the hub body 10 shown in FIG. 11 is identical to that shown in FIGS. 1-5, and described above.

As already stated, FIG. 12 illustrates the end portion 26 opposite to the end portion 25 described above and configured to the connection of spokes according to a conventional crossed configuration. Also in this case, the seats 46 and 47 comprise, respectively, a first housing portion 460, 470 for the heads 110 of attachment to the hub of the spokes 100 and a second housing portion 465, 475 for the spoke body portion 120 immediately adjacent to the head 110 of attachment to the hub. The arrangement and/or orientation of the seats 46 and 47 on the annular front surface 36 of the end portion 26 is known, as shown for example in U.S. Pat. No. 6,036,279, and therefore it shall not be described in this detail.

As shown in FIG. 12, the seats 46 are defined on a first annular portion 261 of the end portion 26 and are of the conventional type (i.e. without retention elements 80, 80a, 81 or 82), whereas the seats 47 are defined on a second annular portion 262 contiguous to the annular portion 261 and outside of it along the longitudinal axis X-X and are provided with retention elements 80 in accordance with the present invention. In such embodiment, when the spokes are mounted in the appropriate seats 46 and 47, the spoke body portions 120 immediately adjacent to the heads 110 of attachment to the hub of the spokes mounted in the seats 46 abut against the spoke body portions 120 immediately adjacent to the heads 110 of attachment to the hub of the spokes mounted in seats 47, whereas the spokes mounted in the seats 47 abut against the retention elements 80. In such a way, the spokes mounted in the seats 47 cannot move along the longitudinal axis of the spoke itself and along the longitudinal axis of the hub body 10. Such spokes, in turn, prevent any movement of the respective spokes that they cross over and that are mounted in the seats 46.

The seats 47 are identical to the seats 45 provided on the opposite front surface 25 (apart from their different orientation on the annular front surface 35) and therefore they shall not be described in any greater detail. The same is true for the seats 46, which differ from the seats 47 only in that they do not have retention elements 80, 80a, 81 or 82.

In a possible variant, each first housing portion 470 of the seats 47 may partially overlap a respective first housing portion 460 of the seats 46 so that when the spokes are mounted in the seats 46 and 47, the respective heads 110 of attachment of the spokes mounted in seats 47 to the hub overlap the heads 110 of the spokes mounted in the seats 46. In such a variant, when the spokes are mounted in the appropriate seats 46 and 47, the heads 110 of attachment to the hub of the spokes mounted in the seats 46 abut against the heads 110 of attachment to the hub of the spokes mounted in seats 47, whereas the spokes mounted in the seats 47 abut against the retention elements 80. In such a way, the spokes mounted in the seats 47 cannot move along the longitudinal axis of the spoke itself and along the longitudinal axis of the hub body 10. Such spokes, in turn, prevent any movement of the respective spokes that they cross over and that are mounted in the seats 46.

Figure 13:
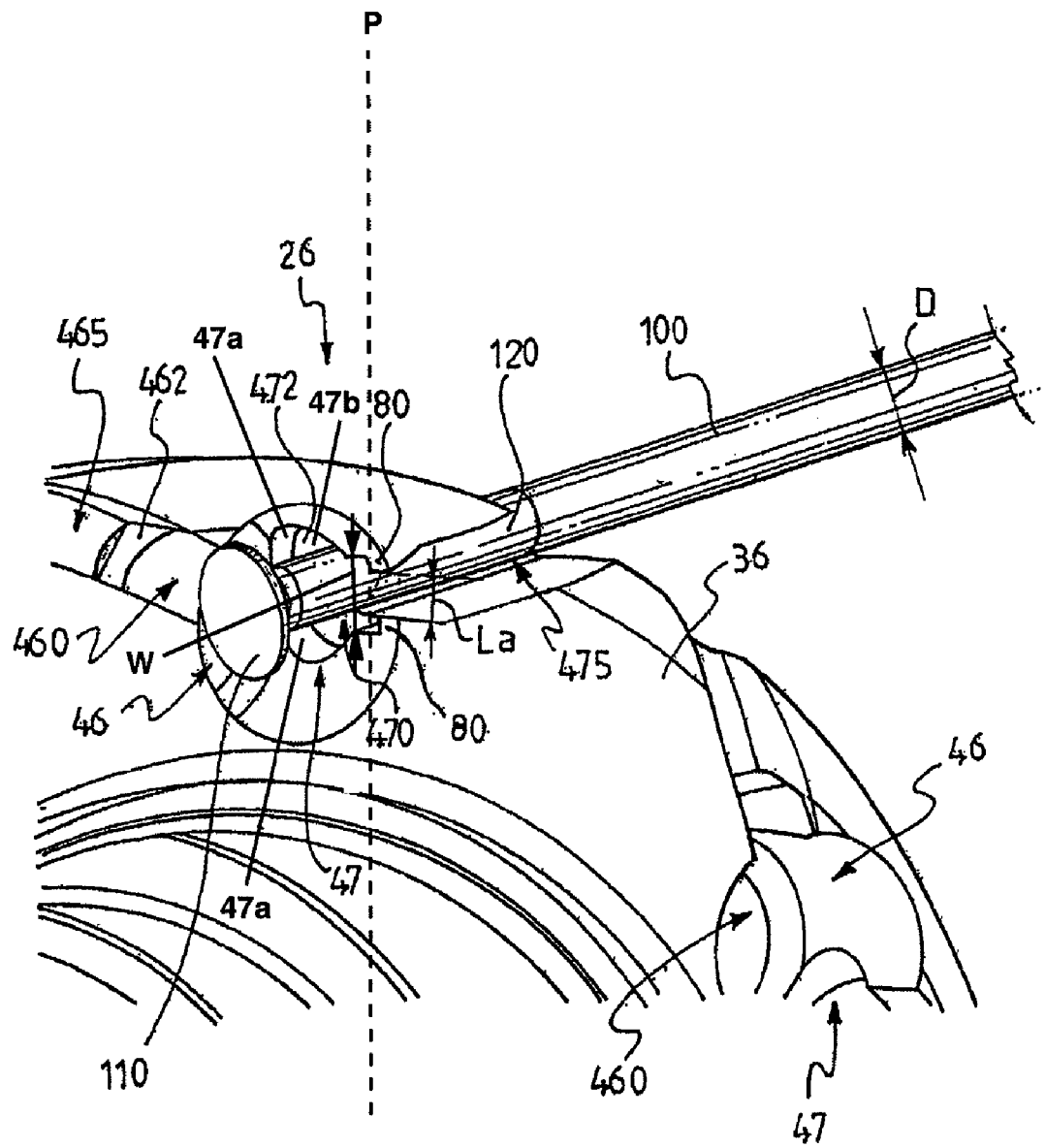
FIG. 13 is a schematic perspective and enlarged view of a detail of an end portion of a seventh embodiment of the hub body of the present invention, in a configuration with one spoke mounted thereon.

FIG. 13 shows a further alternative embodiment of the hub body of the present invention, in which an end portion 26 is configured to the connection of cylindrical spokes, in particular cylindrical spokes with frusto-conical head, according to a conventional crossed configuration. Also the seats 46 and 47 comprise, respectively, a first housing portion 460, 470 for the heads 110 of attachment to the hub of the spokes 100 and a second housing portion 465, 475 for the spoke body portion 120 immediately adjacent to the head 110 of attachment to the hub. The first housing portions 460, 470 of the head 110 of attachment to the hub of the respective spoke 100 comprise respective side surfaces 462, 472 having a shape matching that of the head 110 of attachment to the hub of the respective spokes 100.

As shown in FIG. 13, the seats 46 are of the conventional type (i.e. without retention elements 80, 80a, 81 or 82), whereas the seats 47 are provided with retention means in accordance with the present invention. Each seat 47 includes two side walls 47a that define a cavity 47b therebetween the receives the head 110 of a spoke 100. The cavity 47b has, in at least one portion thereof, a predetermined width W along a plane P that is substantially perpendicular to the side walls 47a. In particular, the retention means comprise a pair of opposite retention elements 80 that define between them an opening of length La shorter than the diameter D of the spoke body 100. The pair of retention elements 80 project along the plane P from the side walls 47a into the cavity 47b. In such a way, when the spokes are mounted in the appropriate seats 46 and 47, the spokes mounted in the seats 47 cannot move along the longitudinal axis of the spoke itself and in turn such spokes prevent any movement of the respective spokes that they cross over and that are mounted in the seats 46.

Figure 14:
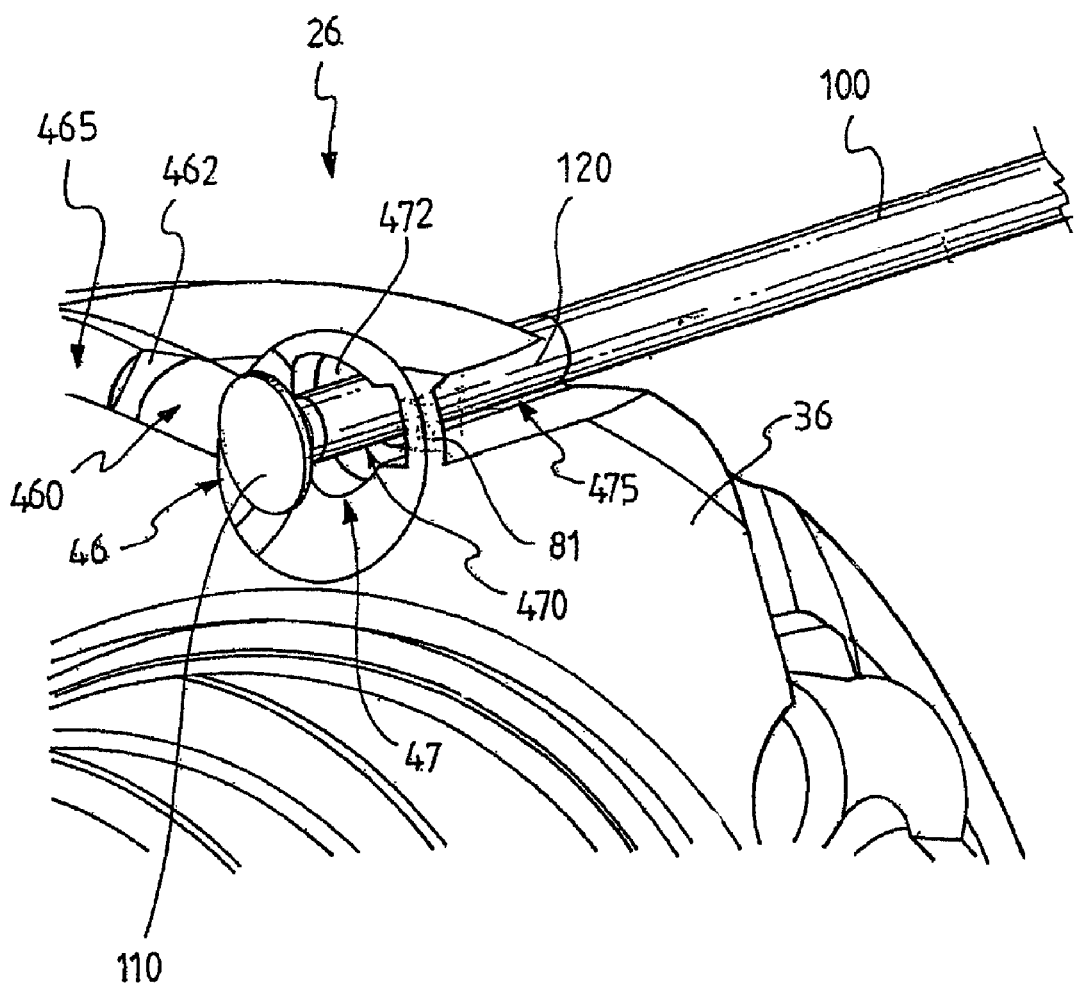
FIG. 14 is a schematic perspective and enlarged view of a detail of an end portion of an eighth embodiment of the hub body of the present invention, in a configuration with one spoke mounted thereon.
Figure 15:
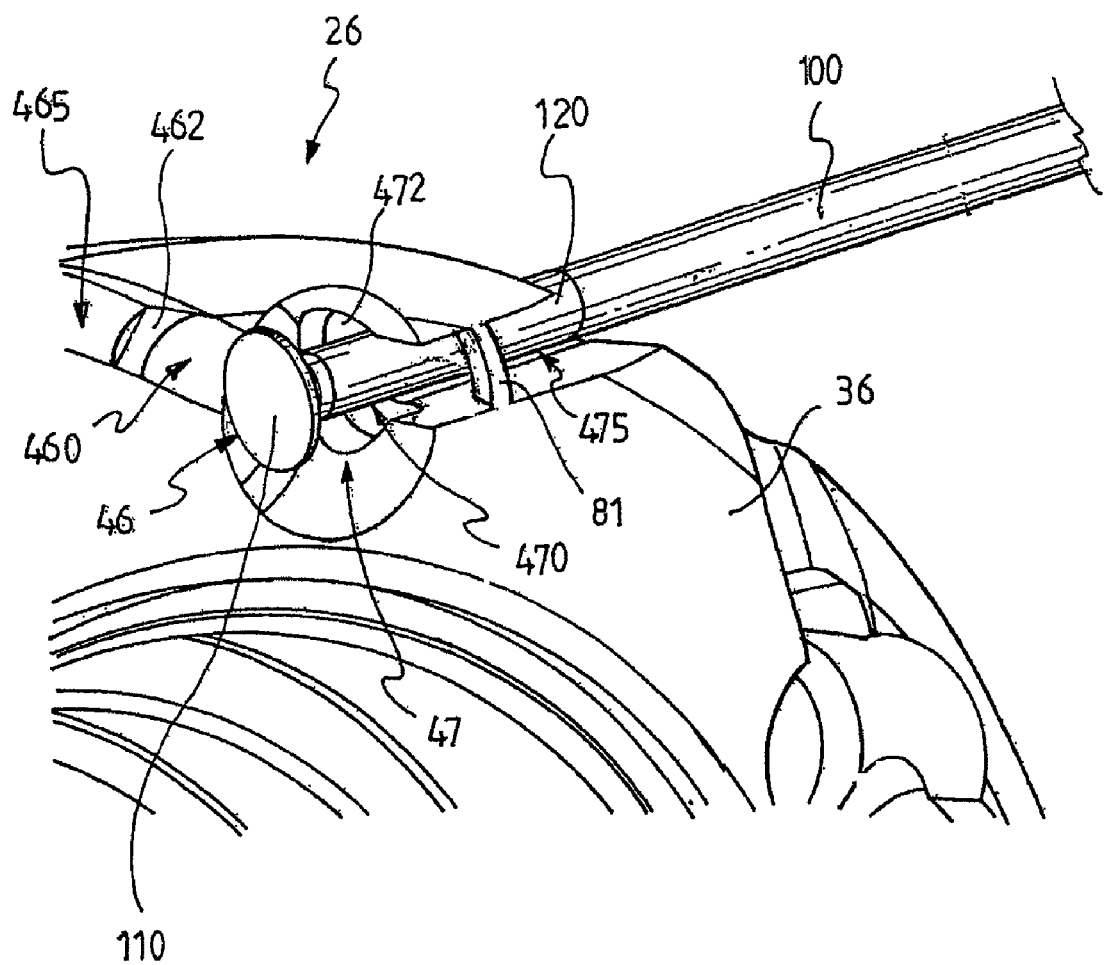
FIG. 15 is a schematic perspective and enlarged view of a detail of an end portion of a ninth embodiment of the hub body of the present invention.

FIGS. 14 and 15 show alternative embodiments of the hub body of the present invention. Such embodiments differ from the one illustrated in FIG. 13 in that the retention means comprise a single element 81 that extends like a bridge on the seat 47 without solution of continuity with the annular front surface 36 of the hub body 10. In the specific example illustrated in FIG. 14, the element 81 is defined at the first housing portion 470 for the head 110 of attachment to the hub of the spoke 100, whereas in the specific example illustrated in FIG. 15, the element 81 is defined at the second housing portion 475 for the spoke body portion 120 immediately adjacent to the head 110 of attachment to the hub.

In the embodiment of the hub body 10 illustrated in FIGS. 1 to 5 and in the variants illustrated in FIGS. 6 to 10 and 13, in the case of breaking or untightening of the spokes, a possible movement of the spoke 100 away from the seat 45 is prevented by the counter action carried out on the side surface of the spoke itself by the pair of retention elements 80, as shown with reference to the spoke 100a in FIG. 3 (obviously, when the width LR is greater than the length $L_a$ of the opening 90).

Such a retention effect can be obtained both for flat spokes and spokes having a portion 120, immediately adjacent to the head 110 of attachment to the hub, of the cylindrical type with diameter D greater than the length $L_a$ of the opening 90.

In the same way, in the embodiments of the hub body 10 illustrated in FIGS. 9-11, in the case of breaking or untightening of the spokes, a possible movement of the spoke 100 away from the seat 45 is prevented by the counter action carried out on the side surface of the spoke itself by the bridge element 81, 82.

On the other hand, with reference to the crossed configuration of the variants illustrated in FIGS. 12 and 13, the retention of the spokes mounted in the seats 47 is achieved through abutment of such spokes against the retention elements 80 properly provided in the seats 47, whereas the retention of the spokes mounted in the seats 46 is achieved through abutment of such spokes against the spokes mounted in the seats 47.

In the same way, in the embodiments of the hub body 10 illustrated in FIGS. 14 and 15, in the case of breaking or untightening of the spokes, a possible movement of the spoke 100 away from the seat 47 is prevented by the counter action carried out by the bridge element 81 on the side surface of the spoke itself.

Hereafter the assembly of the spokes in the respective seats of the different embodiments shall be described for the sake of simplicity and reference shall be made to a radial configuration, like the one illustrated in FIGS. 2-11.

With reference to the embodiments of the hub body 10 illustrated in FIGS. 2 to 8, it has already been stated that the use of such a hub body allows easy assembly of flat spokes, like for example the spoke 100 illustrated in FIG. 5, having a width LR greater, and a thickness SR smaller, than the circumferential length $L_a$ of the opening 90. The assembly of such a spoke in the respective seat 45 is carried out by simply positioning the spoke with its thickness SR in front of the opening 90, then moving the spoke through the opening 90 until it is introduced in the respective seat 45, and finally rotating the spoke about its own longitudinal axis by 90° so as to position it with its portion of width LR arranged substantially parallel to the annular front surface 35 of the hub body 10. The spoke 100 is then moved radially towards the outside of the hub body 10 (i.e. towards the rim) until the head 110 of attachment to the hub is completely housed in the first housing portion 450 of the seat 45.

It is clear that the same assembly methods can be obtained with any type of spoke having a cross section defined by two different dimensions, and in particular with spokes having a longitudinally flat body portion 120 (for example spokes with a rectangular or elliptical section) having, in cross section, a minimum size (for example the thickness SR of the spoke) that is smaller than the circumferential length $L_a$ of the opening 90 and a maximum size (for example the width LR of the spoke) that is greater than the aforementioned circumferential length $L_a$ of the opening 90.

On the other hand, with reference to the embodiments of the hub body 10 illustrated in FIGS. 9-11, in the assembly operations of the spoke on the hub body the spoke is firstly inserted with its end of attachment to the rim at the centre of the end portion 25 of the hub body 10 through the base opening 450a defined in the first housing portion 450 between the front surface 451 and the retention element 81 forming a bridge provided in the seat 45. The spoke is then moved radially towards the outside of the hub body (i.e. towards the rim) until the head 110 of attachment to the hub is housed in the first housing portion 450 of the seat 45.

In the specific case of spokes having a portion 120 immediately adjacent to the head 110 of attachment to the hub of the cylindrical type with a diameter D that is greater than the circumferential length La of the opening 90, the assembly operations can be carried out in a different way according to the specific type of spoke used.

For example, if the spoke is entirely cylindrical, the assembly operations are similar to those described above with reference to FIGS. 9 and 10 (irrespective of whether the retention means consist of a pair of elements 80 or a single bridge element 81, 82). In such a case, the spoke is firstly inserted with its end of attachment to the rim at the centre of the end portion 25 of the hub body 10 through the base opening 450a defined in the first housing portion 450 of the seat 45 by moving it radially towards the outside of the hub body (i.e. towards the rim) until the head 110 of attachment to the hub is housed in the first housing portion 450 of the seat 45. If, on the other hand, the spoke is provided with at least one flat zone with thickness S and width LR and the seats comprise a pair of retention elements 80 with opening 90 of circumferential length $L_a$ that is greater than the thickness S of the flat zone of the spoke and smaller than the width LR of the spoke, the assembly operations are totally analogous to those described above with reference to the flat spokes. In particular, the spoke is positioned with the thickness S of its flat zone in front of the opening 90. Then the spoke is moved through the opening 90 until it is introduced into the respective seat 45, and finally the spoke is rotated about its longitudinal axis by 90° so as to position it with its portion of width LR arranged substantially parallel to the annular front surface 35 of the hub body 10. The spoke is then moved radially towards the outside of the hub body 10 (i.e. towards the rim) until the head 110 of attachment to the hub is completely housed in the first housing portion 450 of the seat 45.

What is claimed is:

1. A hub body for a bicycle wheel, comprising:
   a generally tubular body that extends along a longitudinal axis and has a pair of opposite end portions, with at least one of the end portions defining an annular front surface;
   a plurality of spoke seats oriented along respective non-radial directions on said annular front surface, each one of said plurality of spoke seats having two side walls defining a cavity therebetween that receives a head of a spoke, said cavity having, in at least one portion thereof, a predetermined width along a plane substantially perpendicular to said side walls, wherein at least one of said plurality of spoke seats comprises retention elements that are formed as projecting parts of the annular front surface that project along said plane into said cavity from said side walls and prevent a spoke located within said seat from moving in a direction substantially parallel to said longitudinal axis.

2. The hub body according to claim 1, wherein said retention elements are integrally formed with said annular front surface and extend at least partially across said spoke seats.

3. The hub body according to claim 2, wherein said retention elements each define an opening of predetermined length that is smaller than a maximum size of a cross section of a spoke body portion intended to be associated with said generally tubular body.

4. The hub body according to claim 1, wherein said retention elements each comprise at least one element that extends cantilevered across a respective spoke seat of said plurality of spoke seats and defines an opening of predetermined length.

5. The hub body according to claim 4, wherein said retention elements each comprise a pair of elements that project towards each other from opposite sides of a respective spoke seat of said plurality of spoke seats.

6. The hub body according to claim 1, wherein said spoke seats are oriented on said annular front surface of said hub body such that said spokes cross.

7. The hub body according to claim 6, comprising:
   a plurality of first spoke seats defined on a first annular portion of a first end portion of said generally tubular body for housing end portions of respective first spokes;
   a plurality of second spoke seats defined on a second annular portion of said first end portion of said generally tubular body for housing end portions of respective second spokes;
   wherein said second annular portion is contiguous and arranged on the outside along said longitudinal axis with respect to said first annular portion and wherein said pluralities of first and second spoke seats are oriented so that each of said respective second spokes crosses at least one of said respective first spokes; and
   wherein said retention elements are defined at said plurality of second spoke seats.

8. The hub body according to claim 1, wherein both end portions of said pair of opposite end portions comprise annular front surfaces.

9. The hub body according to claim 8, wherein the spoke seats at a first end portion of said pair of opposite end portions are oriented on the respective annular front surface along respective radial directions and the spoke seats at a second end portion, opposite the first end portion are oriented on the respective annular front surfaces such that said spokes cross.

10. A hub body for a bicycle wheel, comprising:
    a substantially tubular body extending along a longitudinal axis and provided with a pair of opposite end portions, wherein at least one end portion of said pair of opposite end portions comprises an annular front surface;
    a plurality of spoke seats located on said annular front surface and oriented such that spokes positioned within said spoke seats cross each other, each one of said plurality of spoke seats having two side walls defining a cavity therebetween that receives a head of a respective spoke, said cavity having, in at least one portion thereof, a predetermined width along a plane substantially perpendicular to said side walls;
    wherein at least one spoke seat of said plurality of spoke seats further comprises retention elements that are formed as projecting parts of the annular front surface that project along said plane into said cavity from said side walls and prevent a spoke located within the seat from moving in a direction substantially parallel to said longitudinal axis.

11. The hub body according to claim 10 wherein said retention element is integrally formed with said annular front surface and extends at least partially across a respective spoke seat.

12. The hub body according to claim 10, wherein said retention element comprises at least one element that extends cantilevered across a respective spoke seat and defines an opening of predetermined length.

13. The hub body according to claim 12, wherein said retention element comprises a pair of elements that project towards each other from opposite sides of a respective spoke seat.

14. A bicycle wheel hub comprising:
- a generally tubular body that extends along a longitudinal axis and has a pair of opposite end portions with at least one of said pair of opposite end portions defining an annular surface; and
- a plurality of spoke seats oriented along respective non-radial directions on said annular surface, each one of said plurality of spoke seats having two side walls defining a cavity therebetween that receives a head of a spoke, said cavity having, in at least one portion thereof, a predetermined width along a plane substantially perpendicular to said side walls, with at least one of said plurality of spoke seats comprising a retention element that is formed as a projecting part of the annular surface that project along said plane into said cavity from said side walls and prevents a spoke inserted in said selected spoke seat from moving in a direction substantially parallel to said longitudinal axis.

15. The hub according to claim 14, wherein said retention element is integrally formed with said annular surface and extends at least partially across a respective spoke seat.

16. The hub according to claim 14, wherein said retention element defines an opening of a predetermined length that is smaller than a maximum cross section of a respective spoke body portion for which it was dimensioned.

17. The hub according to claim 14 wherein said retention element extends at least partially across a respective spoke seat and defines an opening of predetermined length.

18. The hub according to claim 17, wherein said retention element extends cantilevered from an outer edge of a respective spoke seat.

19. The hub according to claim 17, wherein the retention element comprises a pair of retention elements that project towards each other from opposite sides of a respective spoke seat.

* * * * *